(12) United States Patent
Shelton et al.

(10) Patent No.: US 7,040,239 B2
(45) Date of Patent: May 9, 2006

(54) DOWNDRAFT TABLE

(75) Inventors: Angela Denise Shelton, Jackson, TN (US); Leslie Daily Gist, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 297 days.

(21) Appl. No.: 10/254,811

(22) Filed: Sep. 25, 2002

(65) Prior Publication Data

US 2006/0075936 A1    Apr. 13, 2006

(51) Int. Cl.
    *A47B 37/00* (2006.01)
(52) U.S. Cl. .................................... 108/50.13; 108/161
(58) Field of Classification Search ............... 108/161, 108/24, 25, 26, 50.11, 50.18, 50.13; 454/49
    See application file for complete search history.

(56) References Cited

U.S. PATENT DOCUMENTS

| 1,211,325 | A | * | 1/1917 | Lilly ........................... 454/49 |
| 2,973,790 | A | * | 3/1961 | Huetter ......................... 454/49 |
| 3,442,230 | A | * | 5/1969 | Polen ........................ 108/50.13 |
| 4,650,171 | A | * | 3/1987 | Howorth ....................... 454/49 |
| 5,244,433 | A | * | 9/1993 | Utterback ..................... 454/49 |
| 5,338,248 | A | * | 8/1994 | Sumrack ....................... 454/49 |
| 5,572,934 | A | * | 11/1996 | Aldridge et al. ............... 108/25 |
| 5,584,254 | A | * | 12/1996 | Williams .................... 108/118 |
| 5,645,259 | A | * | 7/1997 | Chen ......................... 108/118 |
| 5,649,997 | A | * | 7/1997 | Cavallero et al. ............. 454/49 |

FOREIGN PATENT DOCUMENTS

EP        601892 A2 *  6/1994

* cited by examiner

*Primary Examiner*—José V. Chen
(74) *Attorney, Agent, or Firm*—Suiter West Swantz pc llo

(57) ABSTRACT

A downdraft table includes an enclosure connected to a downdraft mat member that provides a work surface, a support apparatus, and a conduit member capable of providing dust collection to the work surface. The downdraft mat includes a plurality of through points and is disposed upon a top surface of the enclosure. The conduit member includes one or more connection portals enabling a vacuum device to be connected to the conduit member and provide dust collection to the work surface.

12 Claims, 6 Drawing Sheets

DOWNDRAFT TABLE

FIELD OF THE INVENTION

The present invention generally relates to the field of air filtration, and particularly to a downdraft table capable of providing a portable work surface area that collects dust, debris and other loose material.

BACKGROUND OF THE INVENTION

Woodworking shops deal with dust and other loose airborne materials on a daily basis. The cutting, sanding and shaping of wood products produce airborne particles that may cause harm to an operator who is unaware of the risk or not properly protected. These same risks exist for the craftsman at home working in their workshop.

Commonly woodworkers employ downdraft dust collectors to help collect dust and debris. These downdraft dust collectors provide a work surface, connected to a vacuum device, which allows the dust, debris and other loose materials generated to be vacuumed, through holes in the work surface, away from the work environment and the operator. However, dust, debris or loose material that floats high enough above the work surface is not able to be collected by these downdraft dust collectors and stays in the work environment. Additionally, downdraft dust collectors are bulky, single integrated units, which are typically fixed in location and difficult to transport.

Therefore, it would be desirable to provide a downdraft table capable of providing a portable downdraft work surface with the utility of a downdraft dust collector as well as capabilities to collect airborne particles above the work surface.

SUMMARY OF THE INVENTION

Accordingly, the present invention is directed to a downdraft table capable of providing a flat, stable working surface that is operable as a downdraft dust collector and connected to a conduit member capable of providing vacuuming capabilities above the work surface as well.

In one aspect of the present invention the downdraft table, includes one or more downdraft mat members comprising a work surface, and a conduit member connected to the downdraft table and extending above and below the work surface of the downdraft table. The conduit member connects a vacuum device and contains a plurality of through points both below and above the work surface to provide vacuum suction to the downdraft mat members and directly across the top of the work surface. The one ore more downdraft mat members include a plurality of through points to allow dust, debris and other loose materials to be vacuumed. The downdraft mat members and the conduit member may be integrated with or removably operable upon the downdraft table. The downdraft table further includes a support apparatus.

In another aspect of the present invention the downdraft table includes one or more downdraft mat members, including a plurality of through points, comprising a work surface. A conduit member is connected to the downdraft table, extending above and below the work surface of the downdraft table and a support apparatus is connected to the downdraft table. The support apparatus includes a storage cabinet with shelves and drawers for storage of tools, clothing and other accessories.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 4:
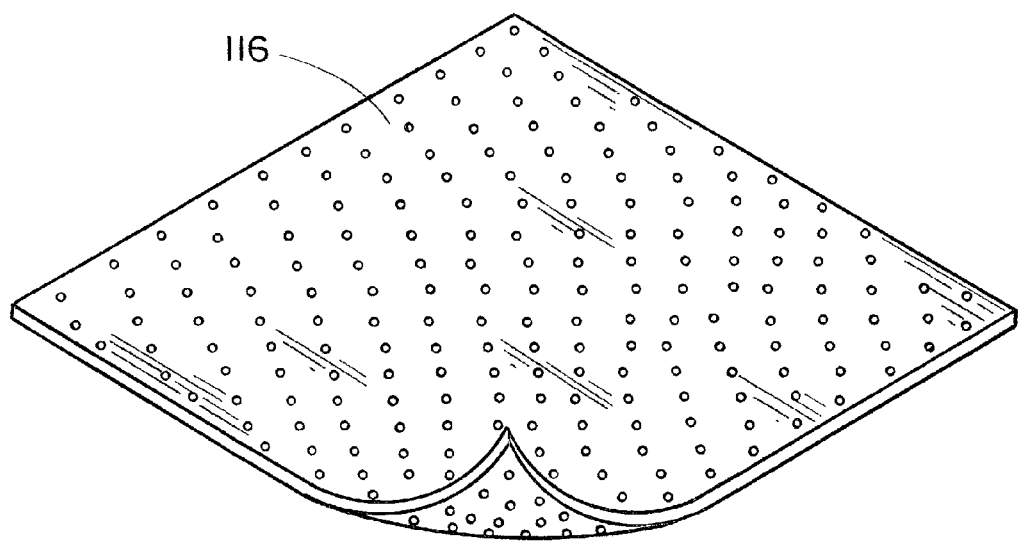
FIG. 4 is an illustration of a downdraft mat member in accordance with an exemplary embodiment of the present invention.
Figure 5:
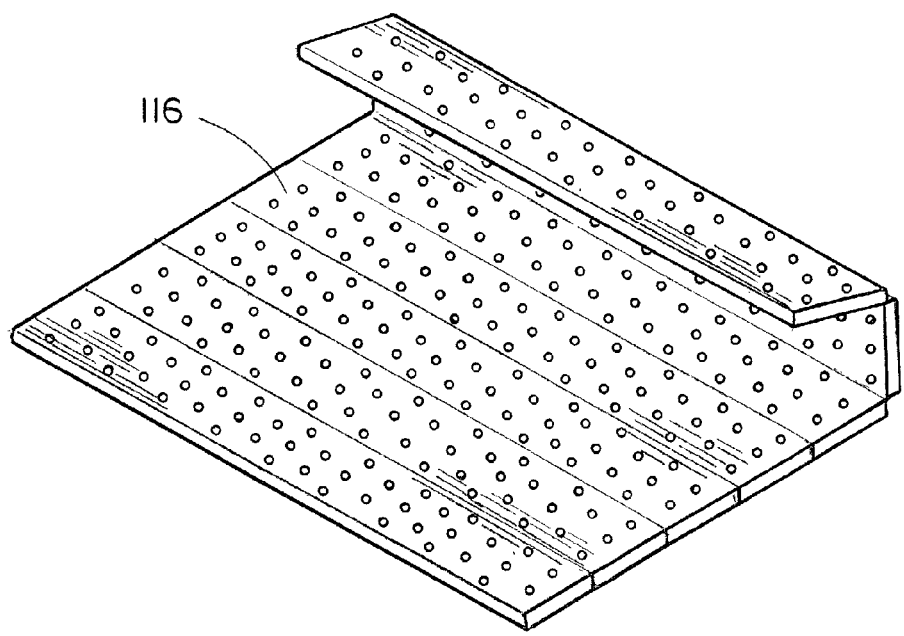
FIG. 5 is an illustration of a segmented, collapsible downdraft mat member.
Figure 6:
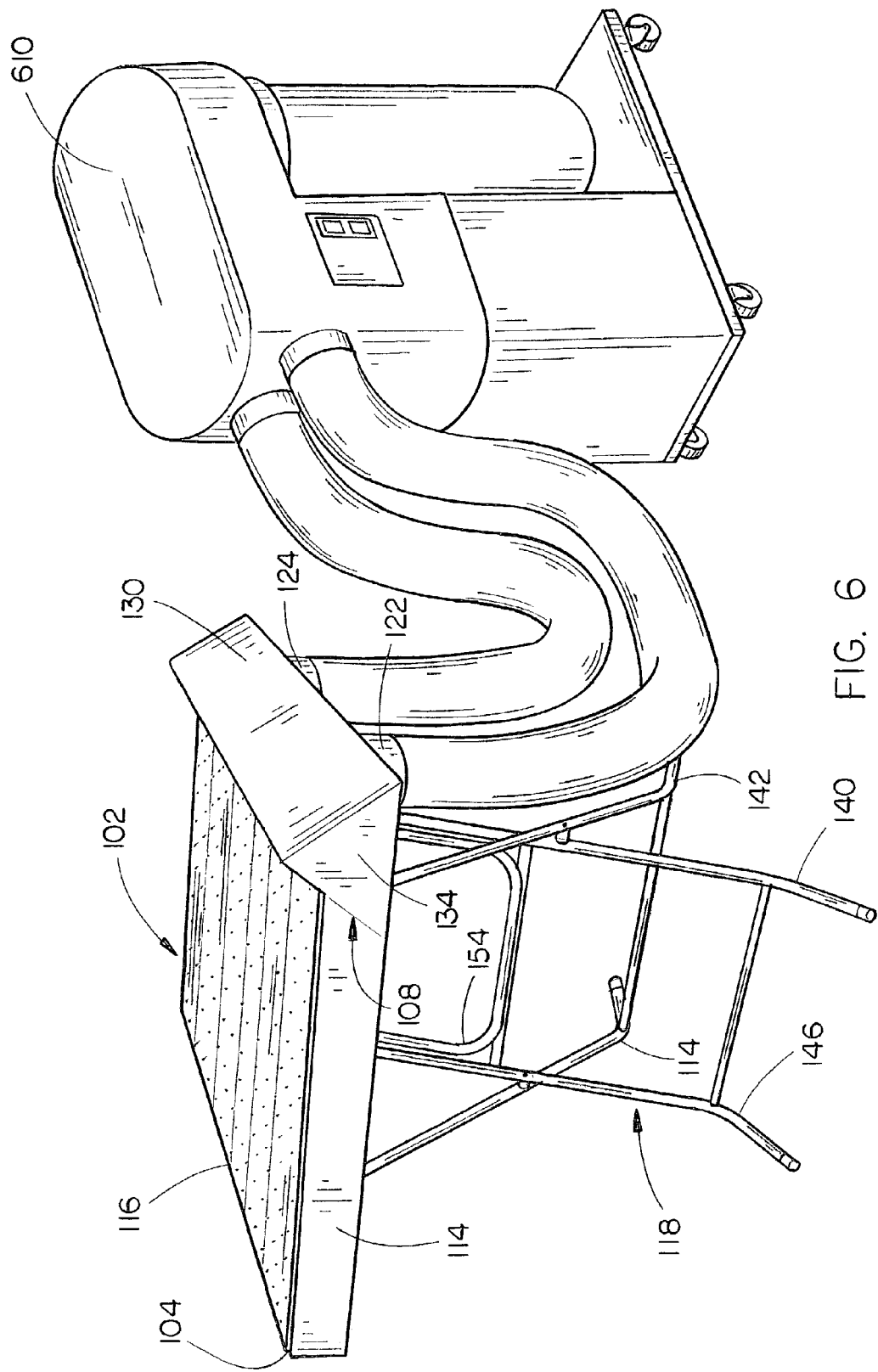
FIG. 6 is an isometric view illustrating the downdraft table operably engaged with a vacuum device.

Referring generally now to FIGS. 1 through 6, exemplary embodiments of the downdraft table of the present invention are shown. A downdraft table, generally designated by reference numeral 100, includes an enclosure 102 with a top surface 104, a bottom surface 106, a first side 108, a second side 110, a third side 112 and a fourth side 114. Top surface 104 is a work surface comprised of downdraft mat member 116. Bottom surface 106 connects a support apparatus 118 and first side 108 connects a conduit member 120, which connects a vacuum device 602 (as shown in FIG. 6) through connection portals 122 and 124. Thus, a flat, stable work surface capable of collecting dust, debris and other loose materials through multiple through points is provided.

Enclosure 102 has the general appearance of a rectangular box, however, enclosure 102 may take a variety of forms as contemplated by one of ordinary skill in the art. With space between top surface 104 and bottom surface 106 its dimensions are defined by sides 108 through 114. Top surface 104 is comprised of downdraft mat member 116. It is to be understood that any number of downdraft mats may comprise the top side of a downdraft work surface area. Bottom surface 106 includes multiple coupling points, which enables connection of support apparatus 118 with enclosure 102. Enclosure 102 is composed of metal, such as steel. It may be composed of a variety of durable materials as may be contemplated by one of ordinary skill in the art.

Mounting brackets may be located on sides 110, 112 or 114 of enclosure 102, thus, allowing enclosure 102 to be mounted against a wall or other suitable stationary object. In such an embodiment, support apparatus 118 may be two legs, which connect to bottom surface 106 of enclosure 102 on the end opposite the mounting brackets. Support apparatus 118 is described further below.

Downdraft mat member 116 is composed of very rigid, durable plastic with multiple through points to provide collection of dust, debris and other loose materials. These mats are injection molded so as to provide superior structural strength. It is contemplated that the mats may be formed by any suitable process. The multiple through points are of a fixed aperture, however, it is contemplated that downdraft mat member 116 may include through points with adjustable aperture size. Adjustment of aperture size may be through the use of single devices that fit within an individual through point and allow a user to constrict or enlarge the aperture. Alternately, an adjustable baffle with matching through points may be connected to downdraft mat member 116 and allow a user to restrict or enlarge all the apertures by moving the baffle. Further, any combination of the above mentioned aperture adjustment technology may be employed as well as that contemplated by one of ordinary skill in the art.

Downdraft mat member 116 couples with enclosure 102 by connecting with top surface 104. Top surface 104 may extend across enclosure 102 and contain through points in matching location to downdraft mat member 116. Alternately, top surface 104 may comprise only support ledges included on the inner surface of first side 108, second side 110, third side 112 and fourth side 114. In such a configuration downdraft mat member 116 is removable and replaceable from top surface 104. It is contemplated that downdraft mat member 116 may be integrated with top surface 104 of enclosure 102.

Downdraft mat member 116 is generally rectangular in shape. It may be shaped to provide a working surface area for a variety of differently shaped downdraft table apparatus. The materials of which downdraft mat member 116 may be composed, may include metals, such as steel, aluminum and the like or any other rigid, durable materials such as wood, fiberglass and the like. Alternately, downdraft mat member may be composed of a flexible material as shown in FIG. 4.

Through the use of hinged joints each individual downdraft mat may be coupled with another allowing the mats to be folded one on top of the other as shown in FIG. 5. This ability may increase the ease of storing the mats when not in use as well as making the setting up of the mats easier. Any number of mats may be coupled in order to customize downdraft mat members to accommodate the needs of a user. Alternately, each individual downdraft mat member may include hinged joints, pivoting joints and the like by which it may be collapsed.

Figure 1:
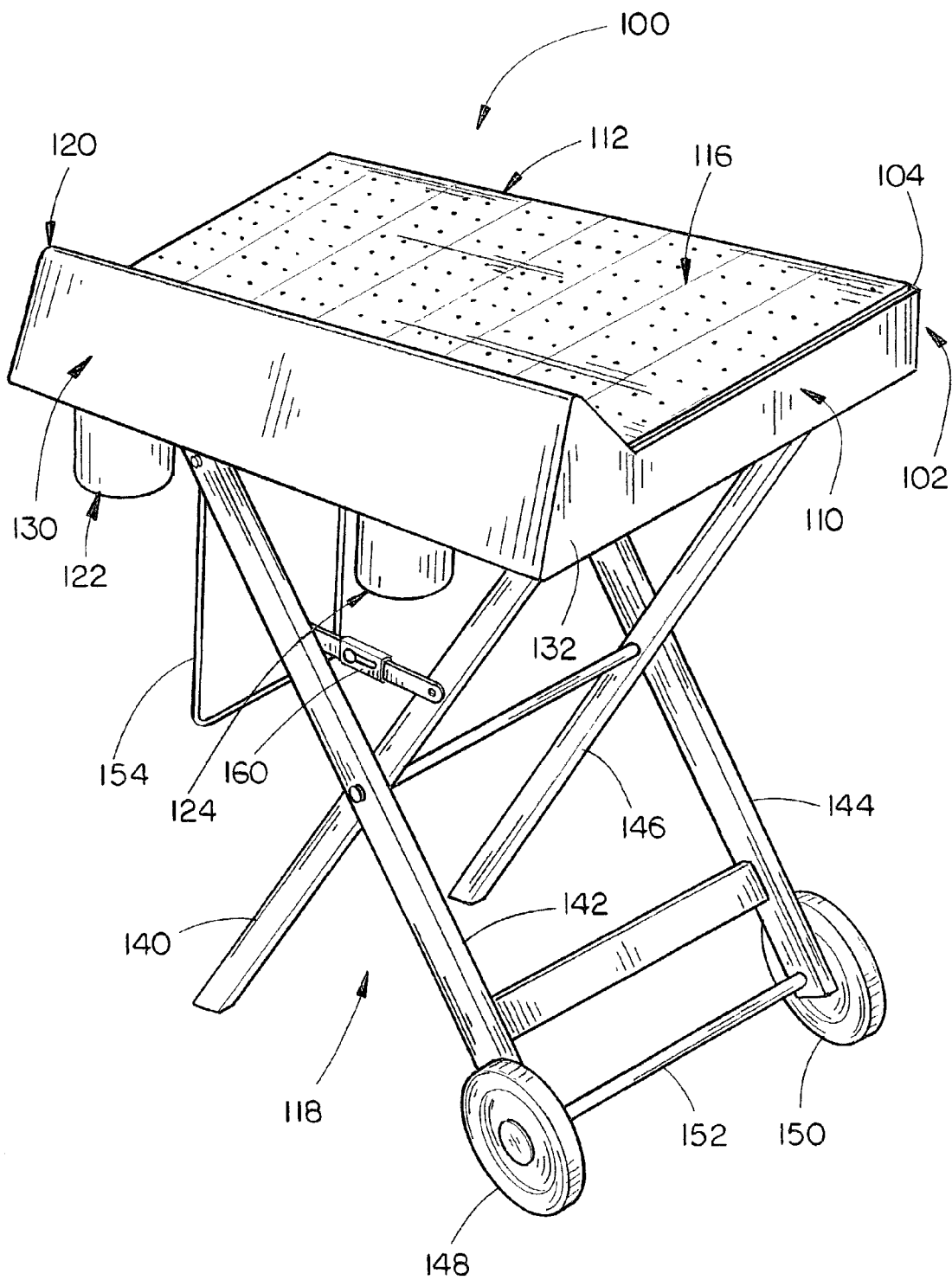
FIG. 1 is an isometric view illustrating a downdraft table in accordance with an exemplary embodiment of the present invention.
Figure 2:
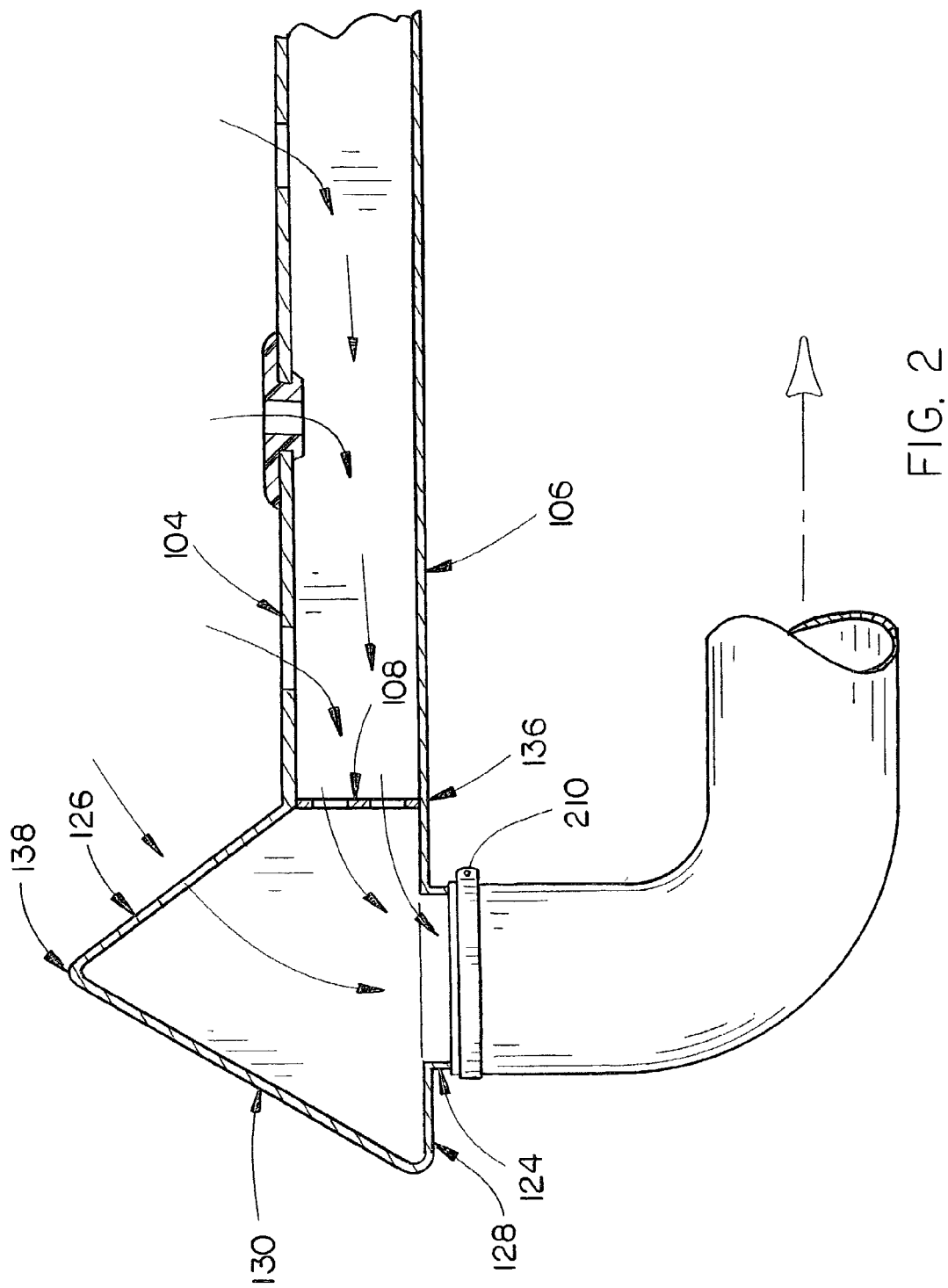
FIG. 2 is a side cross-sectional view of the downdraft dust collector.
Figure 3:
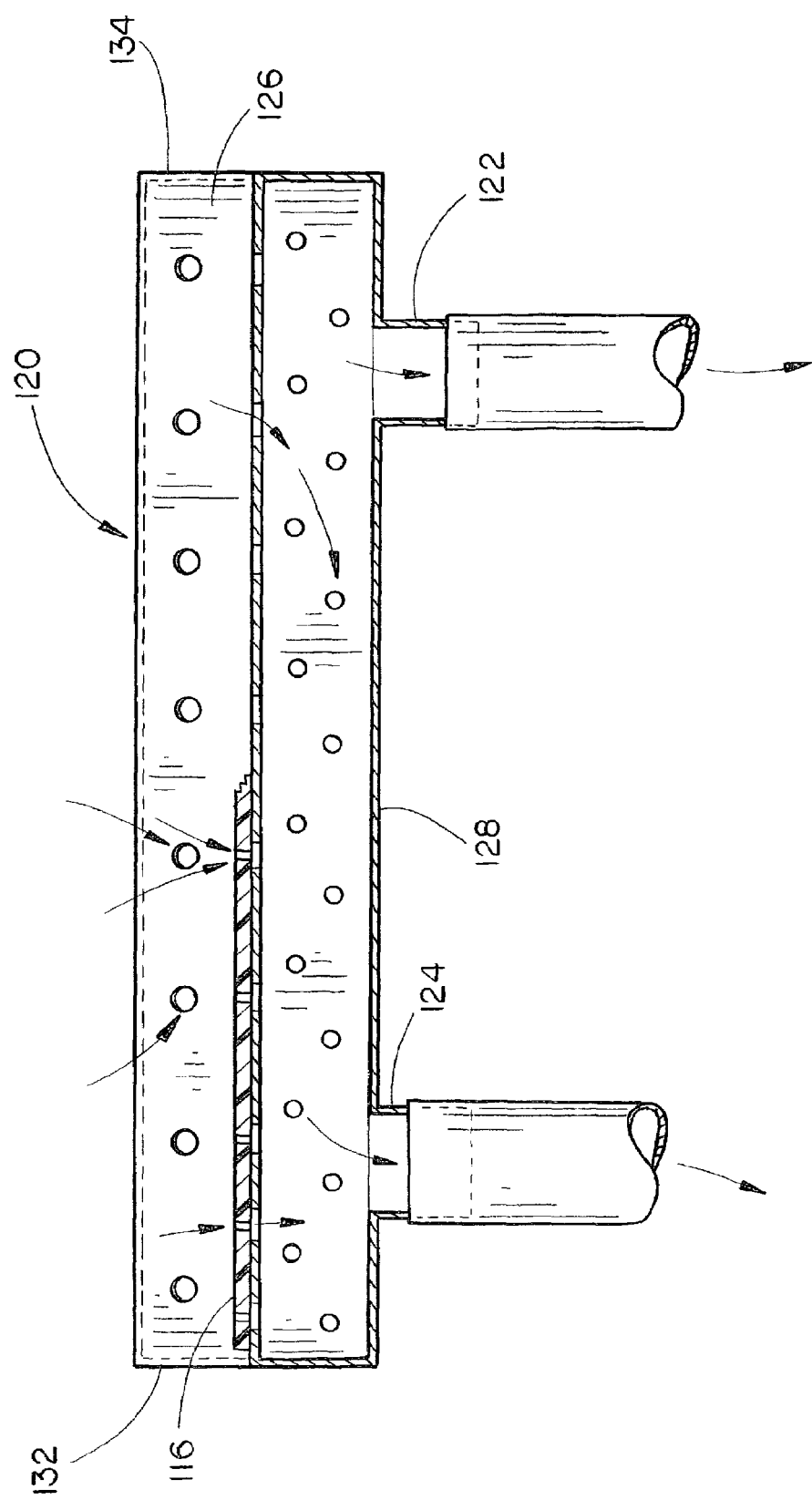
FIG. 3 is an illustration of a conduit member in accordance with an exemplary embodiment of the present invention.

Conduit member 120, as shown in FIGS. 1, 2 and 3, forms a prism shaped enclosure comprised of a first wall 126, a second wall 128 and a third wall 130, a first end 132 and a second end 134. First end 132 and second end 134 are flush with second side 110 and fourth side 114, respectively. First side 108, of enclosure 102, is integrated with the first wall 126 of conduit member 120. Conduit member 120 may be made removable from enclosure 102 through the use of devices such as mounting brackets located on first wall 126 and first side 108. Bottom surface 106 is flush with third wall 130. Top surface 104 integrates with first wall 126 at a point between bottom edge 136 and top edge 138 of first wall 126. First wall 126 contains multiple through points both above top surface 104 and in between top surface 104 and bottom surface 106. The through points above top surface 104 allow dust, debris and other loose materials to be directly sucked into conduit member 120. The through points in-between top surface 104 and bottom surface 106 act as conduits. They provide suction, from a vacuum device, to the plurality of through points within downdraft mat member 116 located on top surface 104 which collect dust, debris and other loose material to be sucked into conduit member 120.

Conduit member 120 may assume a variety of shapes as contemplated by one of ordinary skill in the art. The area of first wall 126 located below top surface 104 and above bottom surface 106 may be an open slot in the alternative to multiple through points. The number, location and size of the through points as well as the connection with the enclosure may vary to meet specific user needs or design preferences.

Second wall 128 includes two connection portals 122 and 124. As shown in FIGS. 2, 3 and 6, connection portals 122 and 124 are circular in shape and provide the ability to connect with a vacuum device (i.e., dust collector 610 as shown in FIG. 6) to provide vacuum suction to downdraft table 100. The shape the connection portals take may vary as contemplated by one of ordinary skill in the art in order to utilize a variety of vacuum device connectors such as vacuum hoses and the like. The vacuum hose of FIG. 2 is connected by connection device 210. Connection device 210 may take a variety of forms such as a compression fastener, screw joint or the like. The number and size of connection portals may be varied as well to accommodate changing needs of the consumer.

Support apparatus 118, as shown in FIG. 1, is comprised of four steel support legs 140, 142, 144 and 146. Support legs 140 through 146 couple with bottom surface 106, through female type ports, of enclosure 102. Other connection devices may be employed to join the support legs to the enclosure without departing from the scope and spirit of the present invention. Support apparatus 118 includes lateral support members to provide increased structural strength and stability. The number and size of such lateral support members may vary as contemplated by one of ordinary skill in the art. Legs 140 through 146 may be composed of a variety of materials such as aluminum, fiberglass, plastic, wood and the like.

Support apparatus 118 may enable downdraft table 100 to be a collapsible structure by folding flush against bottom surface 106 of enclosure 102. As shown in FIG. 1, support apparatus 118 includes a locking slide support arm 160, which enables collapsible functionality of the legs. As shown in FIG. 6, the support legs may be connected together by pivoting joints in order to allow for collapsibility. In both FIGS. 1 and 6, one set of legs may detach completely from bottom surface 106 of enclosure 102 to further enable the collapsible functionality of downdraft table 100. Other methods of enabling downdraft table 100 to collapse are contemplated and would not depart from the scope and spirit of the present invention. In other instances, support apparatus 118 may be capable of completely disconnecting from enclosure 102.

Attached to legs 142 and 144, at the end opposite of the coupling with bottom side 106 of enclosure 102, are wheels 148 and 150, respectively. Wheels 148 and 150 are connected through an axle 152 to each other and legs 142 and 144. Alternately, all four legs 140 through 146 may have wheels connected or legs 140 through 146 may have no wheels attached as shown in FIG. 6. These wheels may include locking mechanisms, allowing users to lock downdraft table 100 in position. The wheels may be casters, rollers or the like. It is contemplated that support apparatus 112 may comprise alternate forms, such as, four legs at each corner, a central post and the like without departing from the scope and spirit of the present invention.

Support apparatus 118 includes a handle 154, connected to legs 142 and 144. Handle 154 is connected just below the coupling point of legs 142 and 144 with bottom side 106 of enclosure 102. Mounting devices such as hinges, brackets and the like may be used to connect handle 154 to support apparatus 118.

A user operating other equipment, such as a table saw, may benefit by support apparatus 118 being capable of adjusting to different heights, thus enabling the use of downdraft table 100. Downdraft table 100 may provide needed extra work surface space as well as being able to collect some of the dust, debris and other loose materials generated by the equipment. Such adjustability may be provided by mechanisms such as, release handles, extension members, a hydraulics system and the like.

Figure 7:
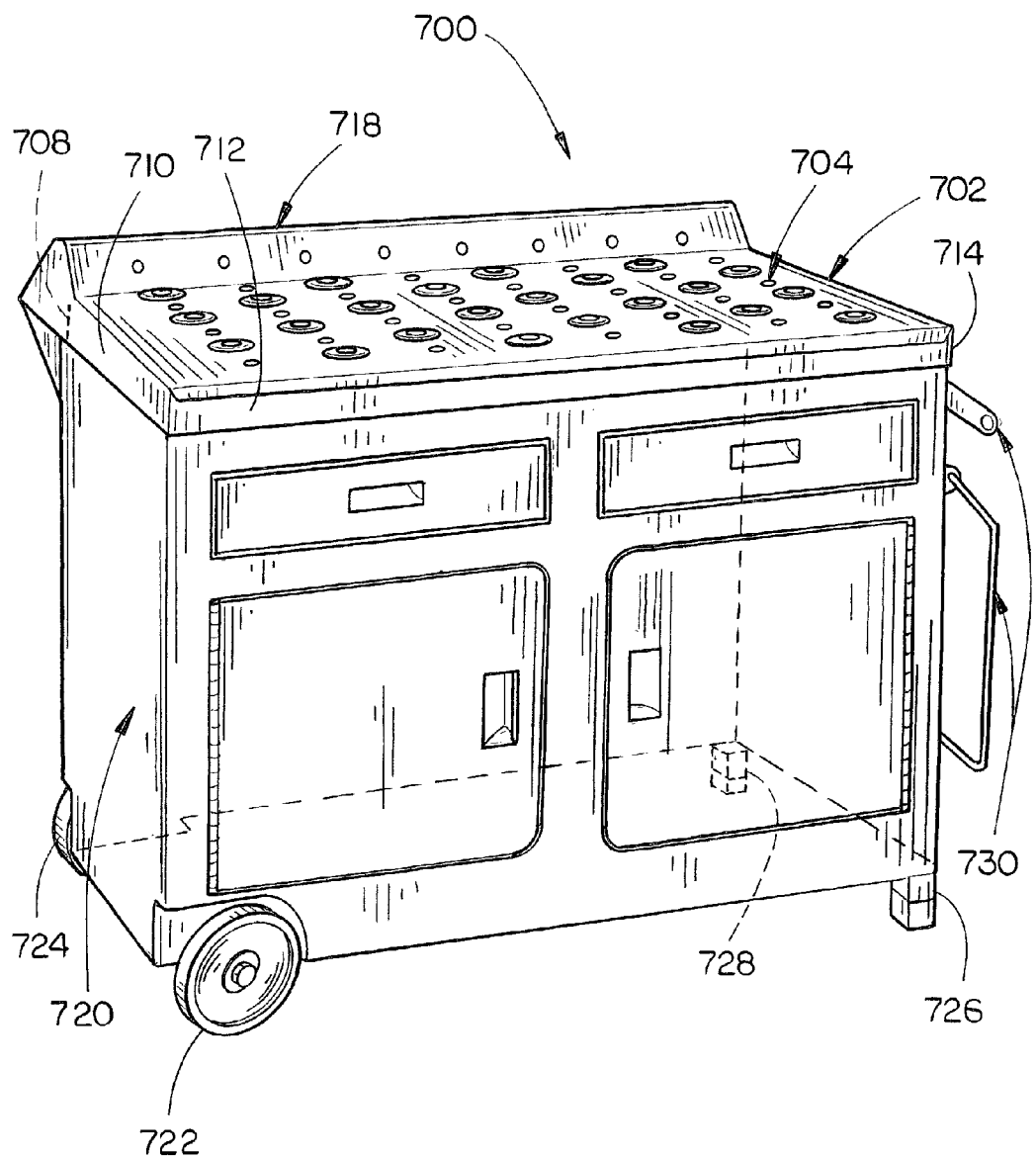
FIG. 7 is an isometric view illustrating the downdraft table with a storage cabinet in accordance with an exemplary embodiment of the present invention.

FIG. 7 illustrates a downdraft table 700 with an enclosure 702 comprised of a top surface 704, a bottom surface 706, a first side 708, a second side 710, a third side 712 and a fourth side 714. Top surface 704 is a downdraft work table and provides the work surface for downdraft table 700. Top surface 704 includes a plurality of through points with alternating through points enabled to adjust the aperture size. A conduit member 718 is connected to first side 708 and a storage cabinet support apparatus 720 is connected to bottom surface 706. Conduit member 718 is comprised of the same features as that for conduit member 120. Top surface 704 has the equivalent functionality of downdraft mat member 116.

Storage cabinet support apparatus 720 is mounted with wheels 722 and 724 equipped with a locking mechanism, and support legs 726 and 728. Wheels 722 and 724 may be casters, rollers or the like as may be contemplated by one of ordinary skill in the art. Other supporting configurations, such as four support legs or four wheels may be employed. A handle 730 is connected to storage cabinet support apparatus 720. It is contemplated that handle 730 be at least one of a swinging arm type and a fixed position type. Additionally, the handle 730 may be of any variety of design without departing from the scope and spirit of the present invention.

Enclosure 702 may be removable from the storage cabinet support apparatus 720. This may enable an operator to place a variety of different enclosures upon storage cabinet support apparatus 720. Storage cabinet support apparatus 720 may include an adjustment mechanism to raise and lower the height of enclosure 702. This adjustment capability enables an operator to match the height of the downdraft work surface to the height of another machine which he may be operating concurrently. The adjustment mechanism may be operable as a hydraulic system, compression lock system, or the like.

It is believed that the downdraft table of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A downdraft table, comprising:
    an enclosure having a first side;
    one or more downdraft mat members connected to the enclosure, at least one of the one or more downdraft mat members being suitable for providing a work surface; at least one of the one or more downdraft mat members being disposed with a plurality of through points for providing dust collection; and
    a conduit member having a first wall connected to a first side of the enclosure, the conduit member being capable of connecting a vacuum device, the conduit member extending above the work surface providing dust collection across the work surface, the conduit member extending below the work surface providing dust collection through the plurality of through points disposed on the one or more downdraft mat members,
    wherein the conduit member is disposed with a plurality of through points both above and below the work surface of the downdraft table for providing vacuuming power to the plurality of through points within the work surface.

2. The downdraft table of claim 1, wherein the one or more downdraft mat members are connected segments.

3. The downdraft table of claim 2, wherein the one or more downdraft mat members are removable from the downdraft table.

4. The downdraft table of claim 1, wherein the downdraft table further includes a support apparatus connected to the enclosure.

5. The downdraft table of claim 4, wherein the support apparatus is enabled to be collapsible.

6. The downdraft table of claim 5, wherein the support apparatus is removable from the enclosure.

7. The downdraft table of claim 6, wherein the support apparatus further comprises a storage cabinet.

8. The downdraft table of claim 1, wherein the enclosure further comprises a top surface that includes a plurality of through points for providing dust collection.

9. A downdraft table, comprising:
    an enclosure having a first side and a top surface, the top surface including a plurality of through points for providing a work surface and for providing dust collection;
    a support apparatus connected to the enclosure; and
    a conduit member with a first wall connected to the first side of the enclosure, the conduit member being capable of connecting a vacuum device, the conduit member extending above the work surface providing dust collection across the work surface, the conduit member extending below the work surface providing dust collection to the work surface;
    wherein the conduit member is disposed with a plurality of through points both above and below the work surface of the downdraft table for providing dust collection to the work surface.

10. The downdraft table of claim 9, wherein the support apparatus is a storage cabinet.

11. The downdraft table of claim 10, wherein the storage cabinet further comprises at least one of a drawer and a shelf.

12. The downdraft table of claim 10, wherein the support apparatus is removable from the enclosure.

* * * * *